Sept. 19, 1933.     J. W. WILLIAMS     1,927,330
SANDING MACHINE
Filed April 16, 1930     3 Sheets-Sheet 1

Inventor:
John W. Williams
By: Theodore W. Miller    Atty.

Sept. 19, 1933.    J. W. WILLIAMS    1,927,330
SANDING MACHINE
Filed April 16, 1930    3 Sheets-Sheet 2
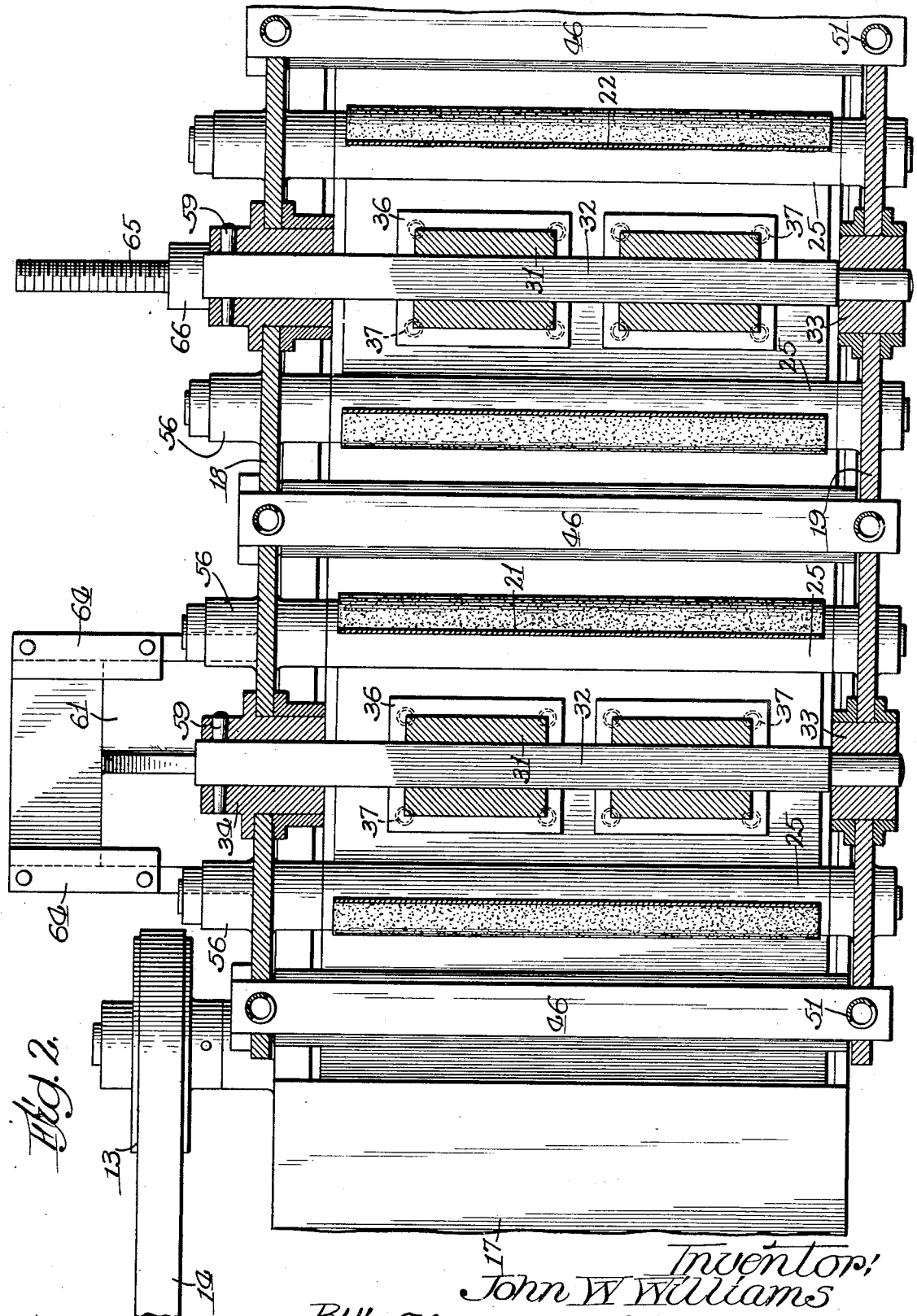
Inventor:
John W Williams
By: Theodore W. Miller Atty.

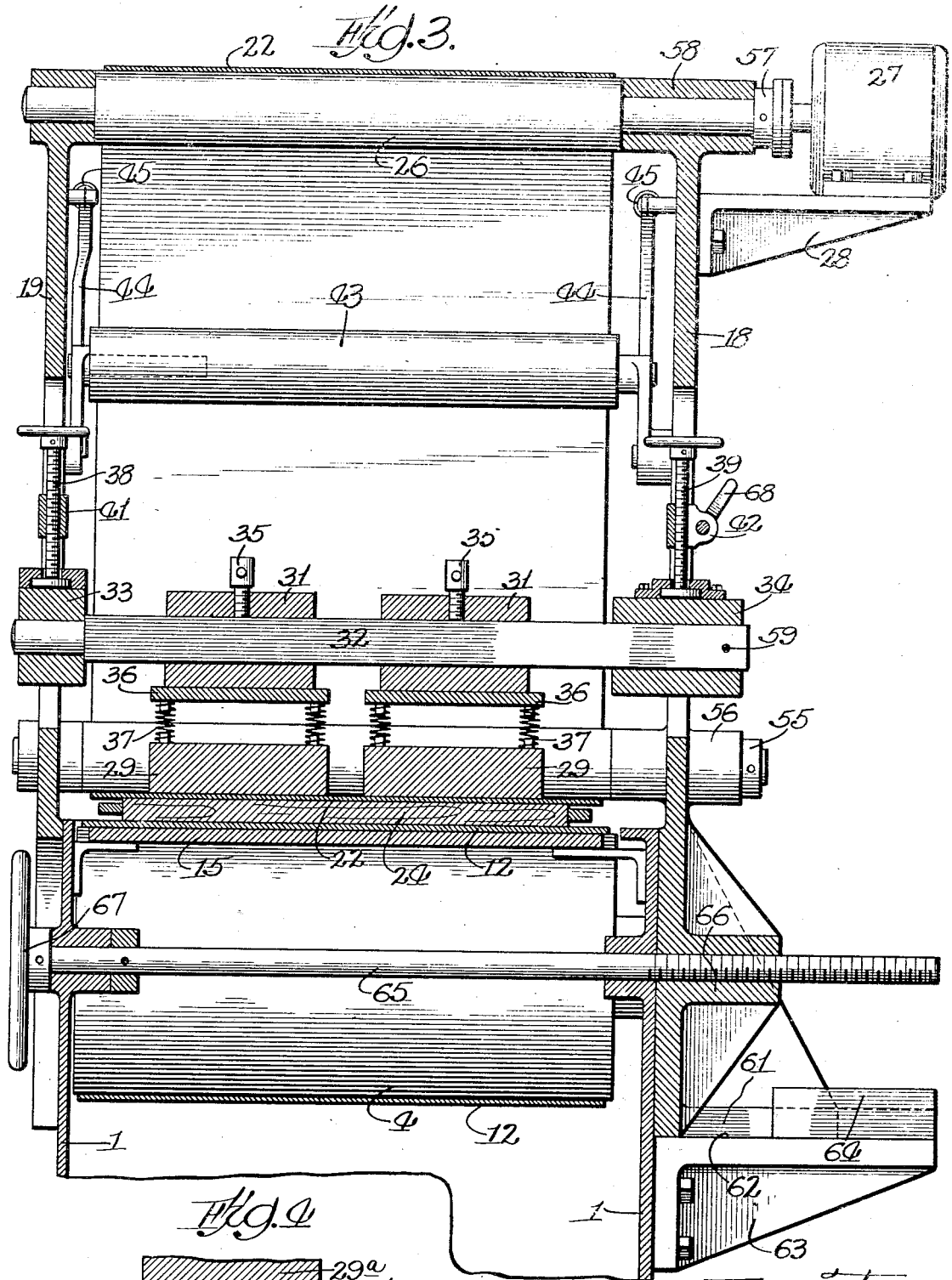

Patented Sept. 19, 1933

1,927,330

UNITED STATES PATENT OFFICE 1,927,330

SANDING MACHINE

John W. Williams, Chicago, Ill.

Application April 16, 1930. Serial No. 444,633

4 Claims (Cl. 51—138)

This invention relates to sanding machines.

Sanding machines, such as have been used in the past, may be classified generally as (1) drum sanders and as (2) belt sanders. The drum sanders have been used primarily for preliminary work preparatory to finishing, or for work which does not require a smooth finish because of the wave effect produced by the drums on the surface of the work. In drum sanding machines the work is passed automatically beneath the drums as the latter are rotated. In the belt sanding machines used heretofore, the work has been stationary and the belt caused to travel over the surface desired to be finished. Manual means, such as a block with a handle thereon, has usually been used to hold the belt against the work. In what is known as the automatic stroke sander a block has been reciprocated across the top of the belt to hold it against the work. I have found that by providing a plurality of blocks and means for yieldingly holding them against the belt, the work may be automatically passed thereunder, during the rotation of the belt, and by providing a series of these belts, each of which may have successive stages of fineness of abrasive thereon, the work of the drum sander and the belt sander may be combined in one machine to more efficiently smooth and polish the work.

The primary object of this invention is, accordingly, to provide an automatic belt sander, wherein the work of the drum and belt sanders are combined.

Other and further objects of this invention will be apparent as the same becomes better understood from an examination of the specification and claims in conjunction with the accompanying drawings, wherein;

Fig. 2 is a horizontal section taken at the line 2—2 of Fig. 1;

Fig. 3 is a transverse section taken at the line 3—3 of Fig. 1;

Fig. 4 is an enlarged fragmentary sectional view through one of the blocks for pressing the belt against the work showing a substitute form of block for sanding grooves in the work.

Figure 1:
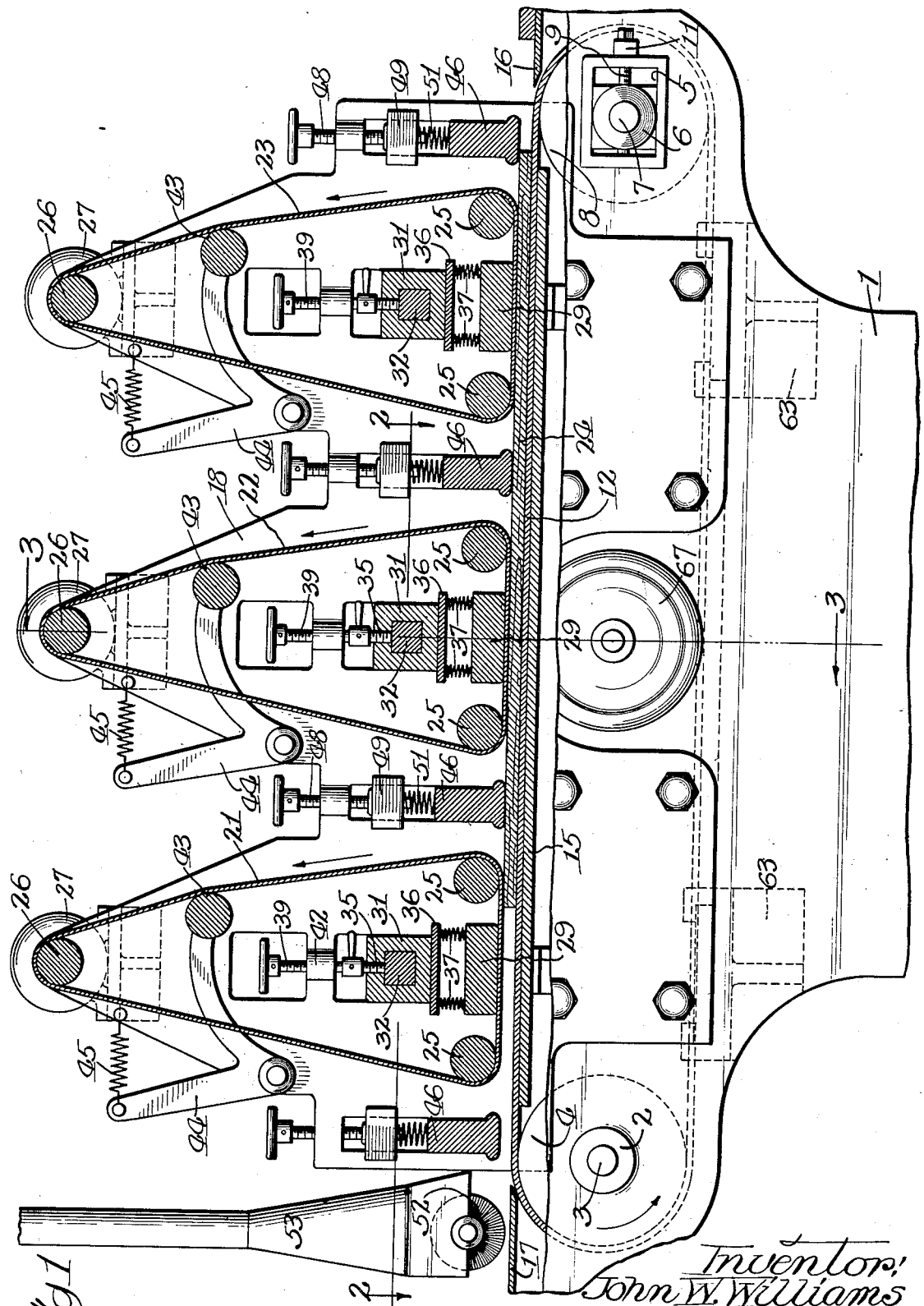
Fig. 1 is a longitudinal section with parts in elevation, of a machine embodying this invention.

Referring to the drawings more particularly, reference character 1 designates the bed of the machine provided with a pair of fixed bearings 2 at one end for supporting a shaft 3 of a conveyer drum 4. The other end of the bed is provided with a pair of rectangular slots 5 containing slidable bearings 6 therein for a second shaft 7, on which is mounted a second conveyer drum 8. The bearings 6 may be longitudinally adjusted in the slots 5 by means of an adjustable screw 9 threaded in each bearing and journaled in a boss 11 on said bed at the outer end of the slots 5. A conveyer belt 12 for the work is mounted on the drums 4 and 8. The screws 9 may be adjustably turned to take up any slack in the belt 12 and to move the bearings 6 toward the shaft 3 prior to placing the belt on the drums. The shaft 3 extends laterally of the bed 1, as shown in Fig. 2, and is provided with a belt wheel 13 adapted to be driven by a drive belt 14, which is connected to a suitable source of power.

A base plate 15 is suitably supported on the bed 1 beneath the upper portion of the conveyer belt 12 to support the work carried thereby. An approach plate 16 is also mounted on the bed to facilitate aligning the work with and delivering the work to the conveyer belt. A receiving plate 17 is also mounted on the bed 1 in alignment with the conveyer belt for receiving the work therefrom at the delivery end thereof.

Extending upwardly from the bed 1, on either side of the conveyer belt 12, is a pair of frame sections 18 and 19 for supporting a plurality, three in this instance, of sanding belts, 21, 22 and 23, together with supporting rollers for said belts and means for adjustably and yieldingly holding the belts against the work on said conveyer. These belts are supported by the sections 18 and 19 so that they successively engage with the work 24 as the same is delivered to the conveyer belt. The belt 23 may be provided with an abrasive which is more coarse than that on the belt 22 and the belt 22 may be provided with an abrasive which is more coarse than that on the belt 21, whereby the belt 23 may make a preliminary cut on the surface of the work and the belts 22 and 21 may smooth and polish said surface, respectively.

The belts 21, 22 and 23 are each supported by means of two transversely extending longitudinally spaced idler rollers 25 and an upper drive roller 26, each of said rollers having their opposite ends, respectively, journaled in the frame sections 18 and 19. The drive roller 26 is driven from an electric motor 27 supported by the section 18 on a bracket 28 bolted thereto. The direction and degree of movement of the drive rollers 26 is such that the belts 21, 22 and 23 will travel much faster and in the opposite direction to the travel of the work 24 on the conveyer belt 12. The rollers 25 are supported sufficiently close to the top of the conveyer belt 12 to allow work of different thicknesses to be operated upon and yet permit a substantial surface of the sanding belts to engage the work when the belts are pressed into engagement with the work of blocks 29, which will now be described.

The blocks 29 may be varied in number, in size and in shape, but are preferably, as shown, rectangular in plan, transversely spaced and yieldingly held against the inner periphery of each sanding belt so as to press the same uniformly over an appreciable area into engagement with the surface of the work. Each block 29 is provided with an apertured carrier 31 by means of which the blocks for each sanding belt may be detachably mounted on a transverse square sectioned rod 32. These rods 32, one for each sanding belt, are mounted in adjustable bearings 33 and 34 connected to the frame sections 18 and 19. The carriers 31 are provided with screws 35 whereby they may be attached in spaced relation to the rod 32 and readily detached therefrom. The carriers 31 are each attached to their respective blocks 29 through the intermediary of a plate 36, one attached to the bottom of each carrier, and springs 37 attached to the bottom of each plate at the four corners thereof and attached to the top of the respective blocks at the corresponding corners. The bearings 33 and 34 are suitably supported at the lower ends of adjusting screws 38 and 39, respectively, each of which is provided with a hand wheel for permitting manual adjustment of the screw. These screws 38 and 39 are threadedly supported in bosses 41 and 42, respectively, integrally formed on the respective frame sections 19 and 18. By means of these manually adjustable screws 48 and 39, the blocks 29 may be adjusted toward and away from the sanding belt and the work to press the belt against the work at any desired pressure.

Tension is maintained on the belts 21, 22 and 23 by idler rollers 43 carried on bell crank levers 44, which are pivoted on the frame section 18 and yieldingly held against the respective belts by means of springs 45, connected between the respective levers and said frame section. Transversely extending bars 46 are mounted in longitudinally spaced relation on the machine and are supported with their opposite ends respectively in vertical slots 47 in the frame sections 18 and 19. One of these bars is mounted at either end of the series of sanding belts and one between each sanding belt for engaging the work and holding it against the conveyer. These bars are each provided at either end with a manually adjustable screw 48 threaded in the corresponding frame section at the top of the slot 47 therein. Each screw 48 is provided with a follower block 49 at its lower end and a spring 51, which is interposed between said block and the corresponding end of the bar 46. By means of the screws 48 the bars 46 may be yieldingly and adjustably held against the work.

A rotatable brush 52 is suitably mounted in transverse relation to the machine at the delivery end thereof, for cleaning the work as it leaves the machine, and a suction intake 53, is mounted above the brush 52 for withdrawing particles swept off of the work by said brush.

In order that the sanding belts may be readily renewed, and also in order that the blocks 29 may be readily changed, if desired, as, for example, for a block such as the block 29ª shown in Fig. 4 for facilitating sanding in a groove 54 in a piece of work 24ª, the frame section 18 is so constructed that it may be moved laterally away from the section 19. For this purpose also the various rollers 25 and 26 and the supporting rods 32 for the blocks are longitudinally fixed with respect to the section 18, but are laterally slidable with respect to the section 19. In this connection it will be seen that the rollers 25 are provided with collars 55 pinned thereto outside of bosses 56 which form the bearings for these rollers integral with the sections 18. The rollers 26 are likewise provided with collars 57 which are pinned to the shafts of said rollers outside of bearings 58 therefor integrally formed in the section 18. The rods 32 are pinned, as at 59, to their bearings 34 in the movable section 18. It will be observed that the bearings 56, 58 and 34 are relatively wide as compared with the corresponding bearings for the respective members 25, 26 and 32 in the stationary frame section 19, as these members are supported solely by the former bearings when the movable frame section 18 is moved laterally, as will now be described.

The frame section 18 is provided with feet 61 which are each slidably mounted on the upper guide surface 62 of a bracket 63 bolted to the side of the bed 1. These feet 61 are also slidably engaged by the undersurface of a flange 64 bolted to each bracket for preventing tipping of the section 18 as the latter is moved laterally. A rod 65 transversely journaled in the bed 1 and threaded at one end in a boss 66 in the section 18 between the feet 61, is provided with an hand wheel 67 at its other end whereby the section 18 may be manually moved laterally to obtain access to the sanding belts for renewing the same and to obtain access to the detachable blocks 29 for replacing them with any other blocks having the configuration desired.

The boss 42 is in the form of a split bearing which may be controlled by a lever 68 to compress or release the screw 39 so that when the blocks 29 have been adjusted to provide the desired pressure against the sanding belt, the screw may be locked.

It will be apparent that the aforedescribed sanding machine effects a substantial saving in labor in that it eliminates the necessity of an operator manually holding a block against the top of the sanding belt to hold the latter in engagement with the work, or as in the case of an automatic stroke belt sander, it eliminates the necessity of an operator holding the reciprocating block in position to press the belt against the work, and further in that it combines the work of the drum sander and the belt sander.

I am aware that many changes may be made without departing from the principles of this invention and I, therefore, do not wish to be limited to the details shown or described.

I claim:

1. In a machine of the character described, the combination of a base, a work support carried thereby, an abrasive belt, a pair of frame sections, a block supported between said sections, one of said sections being slidable to withdraw the block therewith from above the work support and means for actuating said slidable section.

2. In a machine of the character described, the combination of a base, a work support carried thereby, an abrasive belt adapted to engage work on said support, a pair of upright supporting members adapted to support the belt therebetween, one of said members being laterally slidable to withdraw the belt therewith from above the work support and means for actuating the laterally slidable supporting member.

3. In a machine of the character described, the combination of a base, a work support carried thereby, an abrasive belt, a pair of frame sections, a block for holding said belt in contact with work on said support, an elongated supporting member for supporting said block between said pair of sections, the latter being each provided with a bearing for said elongated member, one of said frame sections being slidable and having its bearing aforesaid so connected to the elongated member as to cause the same together with the block supported thereby to be withdrawn when the section is actuated and means for actuating said section to withdraw said block from above the work support, the bearing on the other frame section permitting the withdrawal of the elongated member therefrom upon the actuation of the slidable frame section.

4. In a machine of the character described, the combination of a base, a work support carried thereby, an abrasive belt, a pair of upright supporting members, roller means for the belt journalled between said members, one of said members being laterally slidable to withdraw the roller means and belt therewith from above the work support, the other supporting member permitting the ready withdrawal of the roller means when the slidable member is actuated and means for actuating the slidable member to withdraw the belt from above the work support.

JOHN W. WILLIAMS.